UNITED STATES PATENT OFFICE.

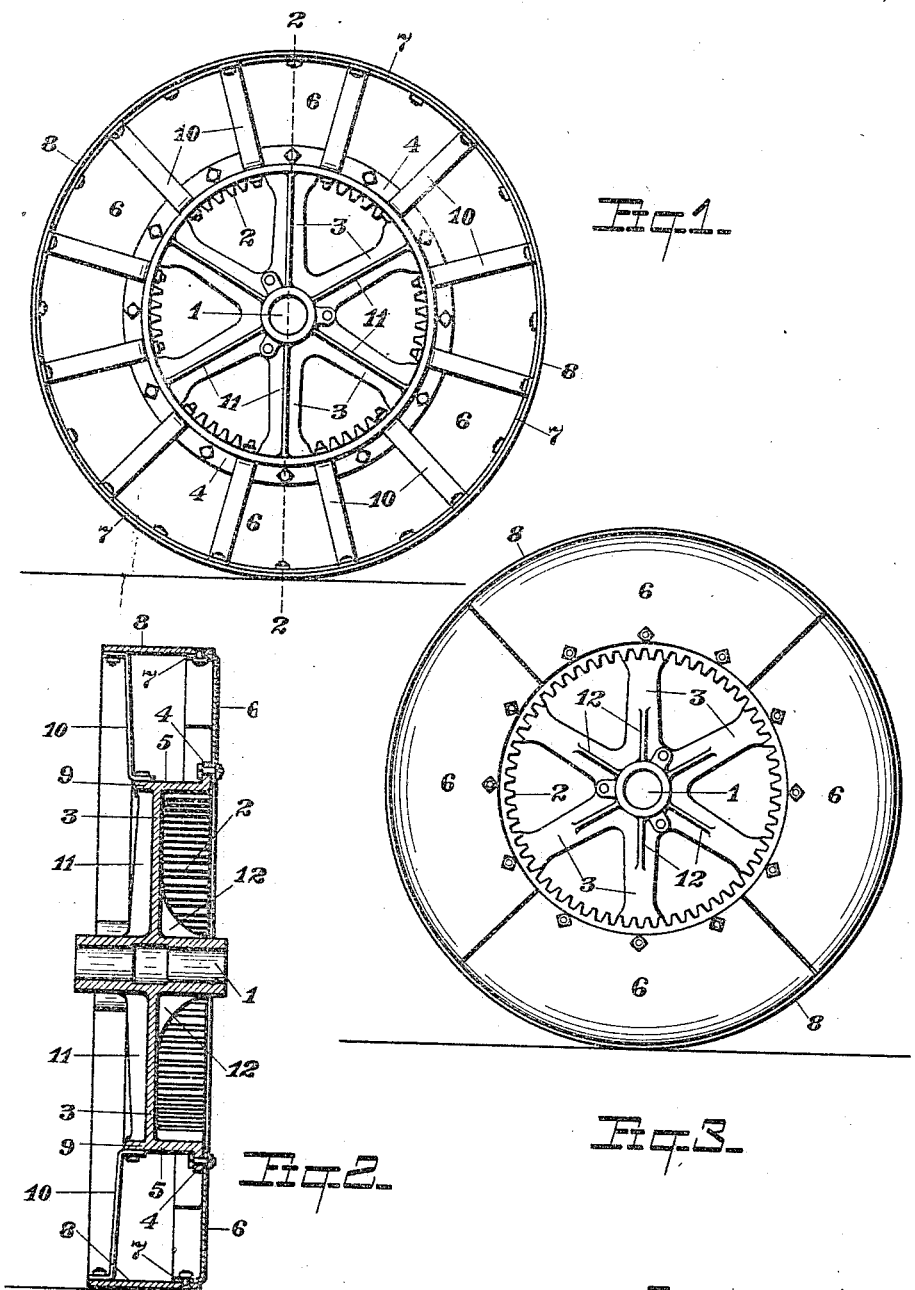

JOSEPH DAIN, OF MOLINE, ILLINOIS, ASSIGNOR TO DEERE AND COMPANY, OF MOLINE, ILLINOIS, A CORPORATION OF ILLINOIS.

TRACTOR-WHEEL.

1,298,017.     Specification of Letters Patent.     Patented Mar. 25, 1919.

Application filed July 12, 1915. Serial No. 39,464.

*To all whom it may concern:*

Be it known that I, JOSEPH DAIN, a citizen of the United States, residing at Moline, in the county of Rock Island and State of Illinois, have invented certain new and useful Improvements in Tractor-Wheels, of which the following is a specification, reference being had therein to the accompanying drawing.

My invention relates to wheels of a type particularly adapted for power tractors, and the object of my invention is to provide a wheel comprising various parts assembled into a compact structure to insure proper strength and efficiency.

Referring to the drawings in which similar numerals indicate identical parts—

Figure 1 is a side elevation of my improved wheel viewed from the outer side.

Fig. 2 is a section on the line 2—2 of Fig. 1.

Fig. 3 is a view in elevation of the inner side of the wheel.

As distinguished from tractor wheels designed to be rotated by contact with the ground my wheel is designed to be rotated by power, and to that end comprises a hub 1 having an annular gear 2 concentric therewith and supported thereon by spokes 3 which are preferably integral with the hub 1 and gear 2. A flange 4 is formed on one edge of the rim 5 of the annular gear 2 and to it are bolted, or otherwise secured plates 6 the outer edges of which are bent to form flanges 7 which fit against the inner face of the tire 8 and to which they are secured by bolts or rivets, so that the plates 6 are held in substantially a right angle to the tire 8, presenting a surface flush with the edges of the tire and the rim of the gear 8 to which the plates are secured, so that no lodgment of soil can occur to be spilled into the gear 2. The other or outer edge portion of the rim 5 extends beyond the spokes 3 and to it are secured spokes 10 which extend to the tire 8 to which they are rigidly connected.

The wheel is adapted to be driven or rotated through the annular gear 2 by connection with a power producing mechanism, and to properly protect the gearing from trash or dirt, which would be picked up by an open wheel, I have closed the space between the rim of the annular gear 2 and the tire 8 on the gear side of the wheel by the plates 6, finding that the latter give ample protection to the gear 2. Furthermore the plates 6 being rigidly secured to the annular gear 2 and the tire 8 the torsion or strain caused by the force exerted on the annular gear 2 to rotate the wheel is so evenly distributed as to be practically neutralized insuring continued rigidity and efficiency of my wheel structure.

While I have shown a plurality of adjoining plates to close the space between the annular gear 2 and the tire 8, I do not limit myself to a plurality of plates or to the exact number shown as it is evident a single plate can be utilized for the same purpose and in the same way, the latter however being a more expensive device.

What I claim is—

1. A wheel for tractors having in combination with a hub and a tire, an annular gear of a lesser diameter than the tire and supported on the hub, means extending from the annular gear to the tire and substantially at a right angle to the tire to close one side of the wheel and present a surface flush with the edge of the gear and the tire, and spokes between the gear and the tire on the opposite side of the wheel.

2. A wheel for tractors having in combination with a hub and a tire, an annular gear of a lesser diameter than the tire and integral with the hub, means secured to the periphery of the annular gear and to the tire and substantially at a right angle to the tire to close a space therebetween on one side of the wheel and present a surface flush with the edge of the gear and the tire, and spokes between the gear and the tire on the opposite side of the wheel.

In testimony whereof I affix my signature, in presence of two witnesses.

JOSEPH DAIN.

Witnesses:
    JESSIE SIMSER,
    N. G. DUFFIELD.